US006940391B1

(12) United States Patent
Ishikura et al.

(10) Patent No.: US 6,940,391 B1
(45) Date of Patent: Sep. 6, 2005

(54) VEHICLE KEY SYSTEM

(75) Inventors: Hisashi Ishikura, Tokyo (JP); Hirofumi Tatsukawa, Tokyo (JP); Masaru Fuku, Tokyo (JP); Keiichi Enoki, Tokyo (JP); Toru Morita, Tokyo (JP); Fumitaka Satou, Tokyo (JP); Koji Nagao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 354 days.

(21) Appl. No.: 09/649,097

(22) Filed: Aug. 28, 2000

(30) Foreign Application Priority Data

Mar. 21, 2000 (JP) ............................ 2000-078941

(51) Int. Cl.[7] ........................ B60R 25/00; G05B 19/00; G06F 7/00; G08B 29/00; H04B 1/00

(52) U.S. Cl. .................... 340/5.72; 340/5.7; 340/5.71; 340/5.82; 340/5.83

(58) Field of Search ............................. 340/5.53, 5.21, 340/5.64, 5.72, 5.8, 5.83, 5.85, 5.51, 5.54, 340/5.61, 825.69, 825.72; 382/115, 116, 382/124; 701/2, 32, 44; 341/176; 235/382, 235/382.5; 180/287

(56) References Cited

U.S. PATENT DOCUMENTS

| | | | | | |
|---|---|---|---|---|---|
| 5,442,341 | A | * | 8/1995 | Lambropoulos | 340/5.26 |
| 5,581,630 | A | * | 12/1996 | Bonneau, Jr. | 382/116 |
| 5,867,802 | A | * | 2/1999 | Borza | 701/35 |
| 5,896,094 | A | * | 4/1999 | Narisada et al. | 340/5.64 |
| 5,990,803 | A | * | 11/1999 | Park | 340/825.34 |
| 6,021,212 | A | * | 2/2000 | Ho | 382/124 |
| 6,041,410 | A | * | 3/2000 | Hsu et al. | 713/186 |
| 6,078,265 | A | * | 6/2000 | Bonder et al. | 340/825.31 |
| 6,100,811 | A | * | 8/2000 | Hsu et al. | 340/825.31 |
| 6,140,939 | A | * | 10/2000 | Flick | 340/825.69 |
| 6,144,293 | A | * | 11/2000 | Plaschko et al. | 340/426 |
| 6,181,254 | B1 | * | 1/2001 | Vogele | 340/825.69 |
| 6,198,996 | B1 | * | 3/2001 | Berstis | 701/36 |
| 6,373,967 | B2 | * | 4/2002 | Pu et al. | 382/115 |
| 6,484,260 | B1 | * | 11/2002 | Scott et al. | 713/186 |

FOREIGN PATENT DOCUMENTS

| | | | |
|---|---|---|---|
| JP | 5-22791 | 3/1993 | E05B 49/00 |
| JP | 11-93478 | 4/1999 | E05B 49/00 |

* cited by examiner

*Primary Examiner*—Michael Horabik
*Assistant Examiner*—Nam Nguyen
(74) *Attorney, Agent, or Firm*—Sughrue Mion, PLLC

(57) ABSTRACT

A vehicle key system comprises a mobile transmitter including a fingerprint information capturing unit for capturing fingerprint information from a user's fingerprint, and a transmit unit for transmitting the fingerprint information captured by the fingerprint information capturing unit together with a system-specific identifier. A receiver disposed in a vehicle includes a receive unit for receiving the fingerprint information and the identifier transmitted from the transmit unit of the mobile transmitter, a verification unit for verifying the fingerprint information against a list of pieces of previously stored fingerprint information, and for verifying the received identifier against a previously stored identifier, and a control unit for controlling pieces of equipment in the vehicle according to verification results from the verification unit.

7 Claims, 3 Drawing Sheets

VEHICLE KEY SYSTEM

BACKGROUND OF THE INVENTION

1. Field of the Invention

The present invention relates to a vehicle key system for verifying the identity of fingerprint information captured and for controlling pieces of equipment in a vehicle according to the verification result. More particularly, it relates to a vehicle key system capable of making it possible for a user owning a plurality of vehicles to manipulate a specific vehicle.

2. Description of the Prior Art

In a conventional vehicle key system as disclosed in Japanese patent publication (TOKKOUHEI) 5-22791 or Japanese patent application publication (TOKKAIHEI) 11-93478, fingerprint information captured by a sensor or the like is transmitted from a mobile transmitter to a receiver mounted on a vehicle and the fingerprint information is verified against previously stored fingerprint information. The vehicle key system can release the lock of doors only if they match.

A problem with a conventional vehicle key system constructed as above is that even when an authorized user owning a plurality of vehicles attempts to manipulate a specific vehicle using his or her own mobile transmitter, the transmission of fingerprint information from the mobile transmitter can make another vehicle key system for another vehicle of his or her own operate, thereby imposing an inconvenience on the user. In other words, when the user manipulates the mobile transmitter to release the lock of doors of a specific vehicle, the transmission of fingerprint information from the mobile transmitter can release the lock of doors of another vehicle. Needless to say, this misoperation is undesirable from the viewpoint of the security.

SUMMARY OF THE INVENTION

The present invention is proposed to solve the above problems. It is therefore an object of the present invention to provide a vehicle key system including a mobile transmitter for transmitting fingerprint information captured together with an identifier specific to the mobile transmitter, and a receiver for verifying the fingerprint information and the system-specific identifier against a list of pieces of previously stored fingerprint information and an identifier stored therein, and for controlling pieces of equipment in a vehicle according to the verification result, thereby making it possible to allow a user to manipulate only the vehicle when the user manipulates the mobile transmitter corresponding to the vehicle.

In accordance with one aspect of the present invention, there is provided a vehicle key system for verifying identity of fingerprint information about a user's fingerprint and for controlling pieces of equipment in a vehicle according to a verification result, the system comprising: a transmitter including a fingerprint information capturing unit for capturing fingerprint information from a user's fingerprint, and a transmit unit for transmitting the fingerprint information captured by the fingerprint information capturing unit together with a system-specific identifier; and a receiver disposed in the vehicle, including a receive unit for receiving the fingerprint information and the identifier transmitted from the transmit unit of the transmitter, a verification unit for verifying the received fingerprint information against a list of pieces of previously stored fingerprint information, and for verifying the received identifier against a previously stored identifier, and a control unit for controlling the pieces of equipment in the vehicle according to verification results from the verification unit.

In accordance with another aspect of the present invention, there is provided a vehicle key system for verifying identity of fingerprint information about a user's fingerprint and for controlling pieces of equipment in a vehicle according to a verification result, the system comprising: a transmitter including a fingerprint information capturing unit for capturing fingerprint information from a user's fingerprint, and a transmit unit for transmitting information including at least one of the fingerprint information captured by the fingerprint information capturing unit and a system-specific identifier; a receiver disposed in the vehicle, including a receive unit for receiving the information from the transmit unit of the transmitter, a verification unit for, when the received information includes the captured fingerprint information, verifying the received fingerprint information against a list of pieces of previously stored fingerprint information, and for, when the received information includes the system-specific identifier, verifying the received identifier against a previously stored identifier, and a control unit for controlling the pieces of equipment in the vehicle according to at least a verification result from the verification unit; and a transmission information selecting unit for selecting, as the information to be transmitted by the transmit unit, only the fingerprint information, only the system-specific identifier, and both of them, according to a manipulation performed by the user.

Preferably, the transmitter includes a displaying unit for displaying information selected by the transmission information selecting unit.

The transmission information selecting unit can include an operation unit that is manipulated by the user when selecting the information to be transmitted by the transmit unit of the transmitter. The transmitter can further comprise a selection information holding unit for holding selection information indicating the selected information, and the receiver further comprises a selection information holding unit for holding selection information indicating the selected information. Either of the transmitter and the receiver includes the operation unit. As an alternative, both of them can include the operation unit.

Preferably, an operation unit intended for operating a piece of equipment disposed in the vehicle also serves as the operation unit. The equipment can be a navigation device. As an alternative, a pedal disposed in the vehicle also serves as the operation unit.

If the verification unit previously stores no fingerprint information, when the received information includes the system-specific identifier, the verification unit can perform only the verification of the received identifier against a previously stored identifier.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
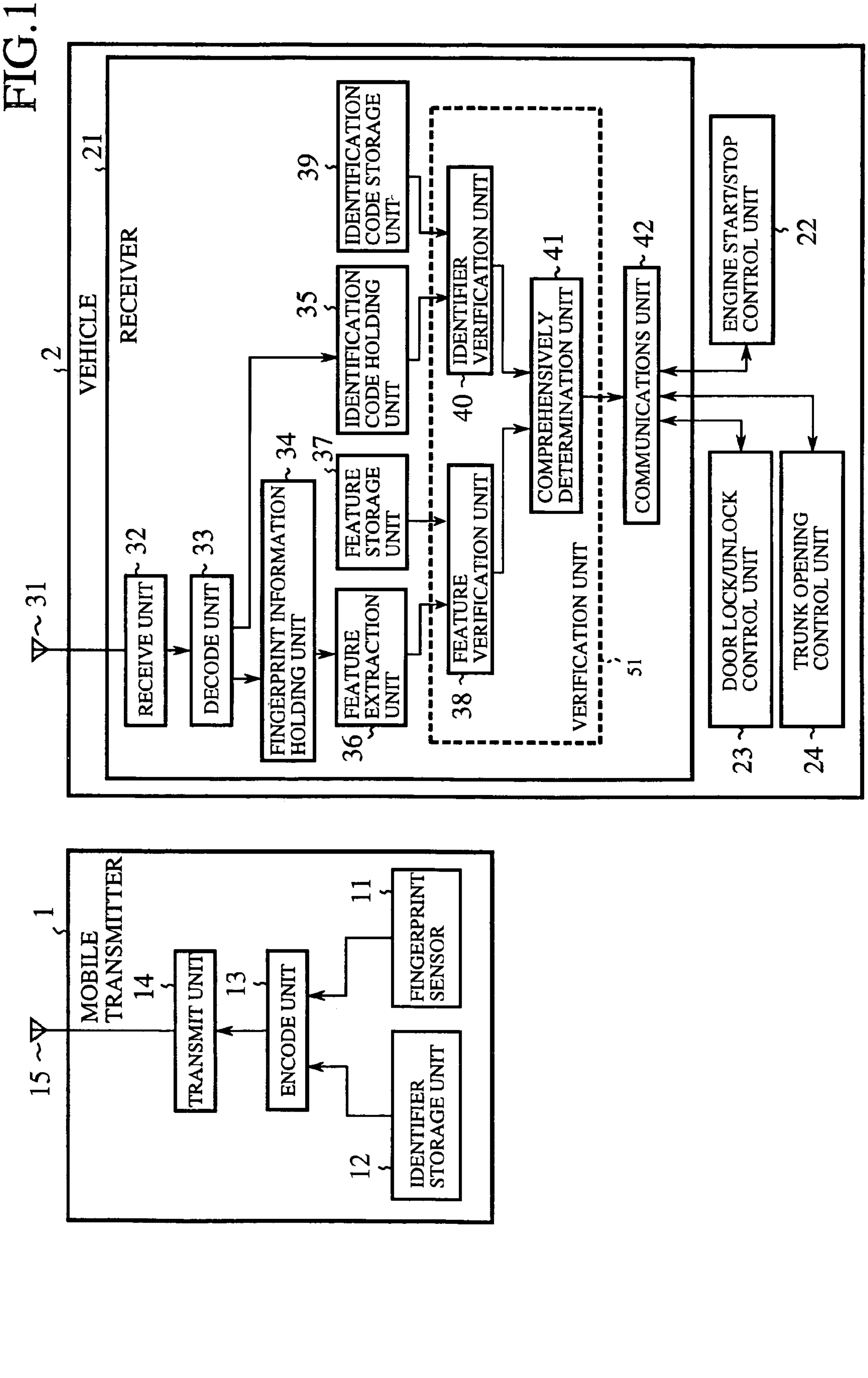
FIG. 1 is a block diagram showing the structure of a vehicle key system according to a first embodiment of the present invention.

Referring next to FIG. 1, there is illustrated a block diagram showing the structure of a vehicle key system according to a first embodiment of the present invention. In the figure, reference numeral 1 denotes a mobile transmitter, and numeral 2 denotes a vehicle. The mobile transmitter 1 is provided with a fingerprint sensor 11 for capturing fingerprint information from a user's fingerprint, an identifier storage unit 12 for storing an identifier specific to the mobile transmitter 1, an encode unit 13 for encoding the fingerprint information and the system-specific identifier using a predetermined encoding method to transform them into encoded transmission data, and a transmit unit 14 for radiating radio waves modulated with the transmission data by way of an antenna 15 to transmit the transmission data.

The vehicle 2 is provided with a receiver 21 for receiving the transmission data from the mobile transmitter 1, for verifying the identity of the user based on the transmission data, and for controlling pieces of equipment in the vehicle, an engine start/stop control unit 22, as a piece of equipment, for controlling an engine according to the verification result from the receiver 21, a door lock/unlock control unit 23, as a piece of equipment, for controlling the lock of doors according to the verification result from the receiver 21, and a trunk opening control unit 24, as a piece of equipment, for controlling the lock of a trunk according to the verification result from the receiver 21.

The receiver 21 is provided with a receive unit 32 for demodulating the radio waves received by way of an antenna 31 to extract the transmission data from them, a decode unit 33 for decoding the extracted transmission data to transform it to the fingerprint information and the identifier, a fingerprint information holding unit 34 for temporarily holding the fingerprint information, and an identifier holding unit 35 for temporarily holding the identifier.

The receiver 21 further includes a feature extraction unit 36 for extracting features from the fingerprint information held by the fingerprint information holding unit, a feature storage unit 37 for storing a plurality of sets of features of authorized users' fingerprints, a feature verification unit 38 for verifying the features extracted from the fingerprint information held by the fingerprint information holding unit against the plurality of sets of previously stored features of authorized users' fingerprints, an identifier storage unit 39 for storing a system-specific identifier, an identifier verification unit 40 for verifying the received identifier held by the identifier holding unit against the identifier stored in the identifier storage unit 39, and a comprehensively determination unit 41 for determining whether or not the user manipulating the mobile transmitter 1 is an authorized user and whether or not the manipulation is directed toward the vehicle 2, according to the verification result from the feature verification unit 38 and the verification result from the identifier verification unit 40. A fingerprint verification unit 51 consists of the feature verification unit 38, the identifier verification unit 40, and the comprehensively determination unit 41.

The receiver 21 also comprises a communications unit 42 for furnishing control signals to the engine start/stop control unit 22, the door lock/unlock unit 23, and the trunk opening control unit 24, respectively, according to the determination results from the comprehensively determination unit 41.

In operation, when the user touches the fingerprint sensor 11 of the mobile transmitter 1 firmly with a finger, the fingerprint sensor 11 captures fingerprint information from the fingerprint of the user's finger and then furnishes it to the encode unit 13. The encode unit 13 reads the system-specific identifier from the identifier storage unit 12. The encode unit 13 then encodes the fingerprint information and the identifier using a predetermined encoding method to transform them to encoded transmission data, and furnishes the transmission data to the transmit unit 14. In this case, the encode unit 13 can transform the fingerprint information and the identifier to encoded transmission data including a continuous sequence of them. The encode unit 13 can also compress them as a single unit, and encrypt them. The transmit unit 14 of the mobile transmitter then modulates a carrier with the transmission data, and transmits the transmission data by radiating the modulated radio waves by way of the antenna 15.

The receive unit 32 of the receiver 21 mounted on the vehicle demodulates the radio waves received by way of the antenna 31 to extract the transmission data from them. The receive unit 32 then furnishes the transmission data to the decode unit 33. The decode unit 33 receives and decodes the transmission data using a decoding method corresponding to the encoding method that the encode unit 13 of the mobile transmitter 1 employs, to transform it to the fingerprint information and the system-specific identifier, and then furnishes the fingerprint information to the fingerprint information holding unit 34. The decode unit 33 also furnishes the identifier to the identifier holding unit 35. The fingerprint information holding unit 34 temporarily latches the fingerprint information from the decode unit. The identifier holding unit 35 temporarily latches the system-specific identifier from the decode unit.

The feature extraction unit 36 reads the fingerprint information from the fingerprint information holding unit 34, and then extracts features from the fingerprint information and furnishes the features to the feature verification unit 38. The feature verification unit 38 sequentially reads one set of previously stored features of an authorized user's fingerprint from the fingerprint information storage unit 37 and then compares the extracted features against the set of features of the authorized user's fingerprint read out of the fingerprint information storage unit 37. In other words, the feature verification unit 38 searches through the fingerprint information storage unit for one set of features that match the extracted features. After the feature verification unit 38 finds a match or completes the verification of the extracted features against all sets of previously stored features of authorized users' fingerprints, it furnishes the verification result to the comprehensively determination unit 41. The fingerprint information storage unit 37 can store a plurality of pieces of fingerprint information about authorized users' fingerprints, instead of a plurality of sets of features of authorized users' fingerprints. In this case, before comparison between the extracted features and any set of features of an authorized user's fingerprint, the features of the authorized user's fingerprint are extracted from a corresponding piece of fingerprint information read out of the fingerprint information storage unit 37.

On the other hand, the identifier verification unit 40 reads the received identifier from the identifier holding unit 35 and reads the system-specific identifier from the identifier storage unit 39. The identifier verification unit 40 then compares the received identifier with the system-specific identifier to determine whether they match, and furnishes the determination result to the comprehensively determination unit 41.

The comprehensively determination unit 41 determines whether or not the user manipulating the mobile transmitter 1 is an authorized user and whether or not the manipulation is directed toward the vehicle 2, according to the verification result from the feature verification unit 38 and the verification result from the identifier verification unit 40. The comprehensively determination unit 41 then furnishes the determination results to the communications unit 42. The communications unit 42 furnishes control signals to the engine start/stop control unit 22, the door lock/unlock unit 23, and the trunk opening control unit 24, respectively, according to the determination results from the comprehensively determination unit 41.

For example, when the user manipulating the mobile transmitter 1 is an authorized user and when the manipulation is directed toward the vehicle 2, the communications unit 42 furnishes a control signal to allow the user to start the engine to the engine start/stop control unit 22, a control signal to allow the user to release the lock of doors to the door lock/unlock unit 23, and a control signal to allow the user to release the lock of the trunk to the trunk opening control unit 24.

As previously mentioned, in accordance with the first embodiment of the present invention, the vehicle key system can provide the mobile transmitter 1 with a system-specific identifier, transmit fingerprint information captured, together with the identifier, to the receiver 21 mounted on the vehicle, verify the captured fingerprint information against a list of pieces of previously stored fingerprint information, verify the received identifier against a previously stored identifier, and control pieces of equipment in the vehicle according to the verification results. Accordingly, the present embodiment can offer an advantage of providing a vehicle key system that, when an authorized user manipulates a mobile transmitter to use a specific vehicle, makes it possible to control only the vehicle on which a receiver corresponding to the mobile transmitter is mounted.

Embodiment 2

Figure 2:
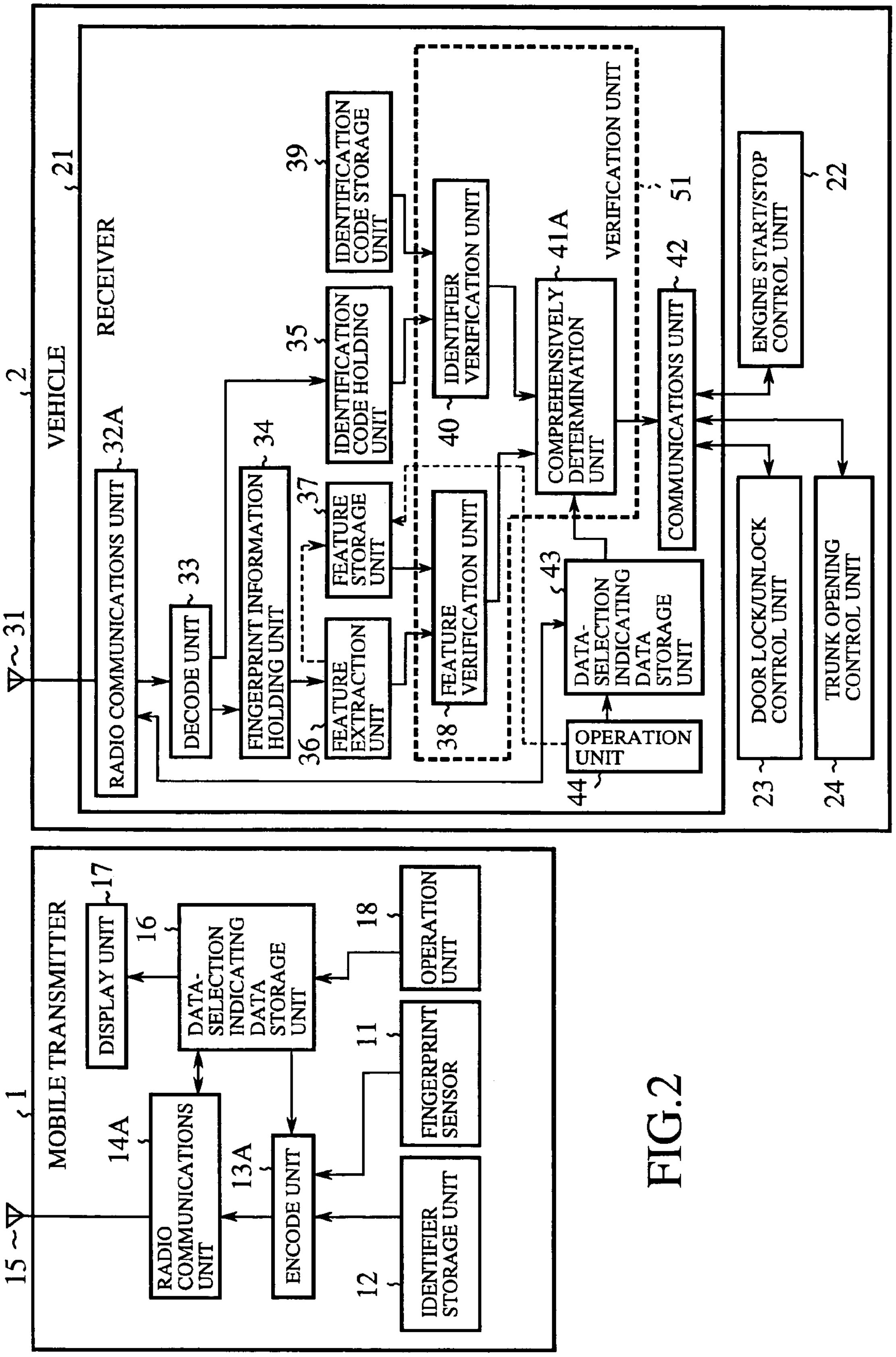
FIG. 2 is a block diagram showing the structure of a vehicle key system according to a second embodiment of the present invention.

Referring next to FIG. 2, there is illustrated a block diagram showing the structure of a vehicle key system according to a second embodiment of the present invention. In the figure, the same reference numerals as shown in FIG. 1 denote the same components as of the above-mentioned first embodiment, and therefore the description of those components will be omitted hereinafter. In FIG. 2, reference numeral 13A denotes an encode unit for encoding only fingerprint information captured by a fingerprint sensor 11, only an identifier specific to the system, or both of them to transform it or them into encoded transmission data according to selection of information to be verified from the fingerprint information and the identifier, numeral 14A denotes a radio communications unit for transmitting the transmission data and for transmitting or receiving data-selection indicating data indicating the selection of information to be verified from the fingerprint information and the identifier, numeral 16 denotes a data-selection indicating data storage unit for storing the data-selection indicating data whose value is set by an operation unit 18 or which is received by way of the radio communications unit 14A, and numeral 17 denotes a display unit for displaying which information to be verified is selected from the fingerprint information and the identifier, i.e. kinds of information to be verified, which are selected by the user. The operation unit 18 can select only the fingerprint information, only the identifier, or both of them, as information to be verified, from these pieces of information, and set the value of the data-selection indicating data, according to a manipulation performed by the user. Alternatively, an operation unit 44 within a receiver 21 mounted on a vehicle 2 can perform the selection of information to be verified from the fingerprint information and the identifier. In either case, the data-selection indicating data indicating the selection of information to be verified from the fingerprint information and the identifier can be stored in both the transmitter and the receiver.

The receiver 21 is provided with a radio communications unit 32A for receiving the transmission data and for transmitting or receiving the data-selection indicating data, and a comprehensively determination unit 41A for determining whether or not to enable a plurality of control units 22 to 24, according to a verification result from a feature verification unit 38, a verification result from an identifier verification unit 40, or both of them. Which verification result is used for the comprehensively determination is based on the selection of information to be verified from the fingerprint information and the identifier. The receiver 21 further includes a data-selection indicating data storage unit 43 for storing the data-selection indicating data whose value is set by the operation unit 44 or which is received by way of the radio communications unit 32A. As previously mentioned, the operation unit 44 can select only the fingerprint information, only the identifier, or both of them, as information to be verified, from these pieces of information, and set the value of the data-selection indicating data, according to a manipulation performed by the user.

In operation, when the user touches the fingerprint sensor 11 of the mobile transmitter 1 firmly with a finger, the fingerprint sensor 11 captures fingerprint information from the fingerprint of the user's finger and then furnishes it to the encode unit 13A. The encode unit 13A reads the data-selection indicating data from the data-selection indicating data storage unit 16. According to the data-selection indicating data, the encode unit 13A then encodes only the fingerprint information, only the identifier, or both of them using a predetermined encoding method to transform it or them to encoded transmission data, and furnishes the transmission data to the radio communications unit 14A. The radio communications unit 14A of the mobile transmitter then modulates a carrier with the transmission data, and transmits the transmission data by radiating the modulated radio waves by way of an antenna 15.

The radio communications unit 32A of the receiver 21 mounted on the vehicle demodulates the radio waves received by way of an antenna 31 to extract the transmission data from them. The radio communications unit 32A then furnishes the transmission data to the decode unit 33. The decode unit 33 receives and decodes the transmission data using a decoding method corresponding to the encoding method that the encode unit 13A of the mobile transmitter 1 employs. When the decoded data includes the fingerprint information, the decode unit 33 furnishes the fingerprint information to a fingerprint information holding unit 34. When the decoded data includes the identifier, the decode unit 33 furnishes the identifier to an identifier holding unit 35. The fingerprint information holding unit 34 temporarily latches the fingerprint information from the decode unit. The identifier holding unit 35 temporarily latches the system-specific identifier from the decode unit.

A feature extraction unit 36 reads the fingerprint information from the fingerprint information holding unit 34, and then extracts features from the fingerprint information and furnishes the features to the feature verification unit 38. The feature verification unit 38 sequentially reads one set of previously stored features of an authorized user's fingerprint from a fingerprint information storage unit 37 and then compares the extracted features against the set of features of the authorized user's fingerprint read out of the fingerprint information storage unit 37. In other words, the feature verification unit 38 searches through the fingerprint information storage unit for one set of features that match the extracted features. After the feature verification unit 38 finds a match or completes the verification of the extracted features against all sets of previously stored features of authorized users' fingerprints, it furnishes the verification result to the comprehensively determination unit 41A.

On the other hand, the identifier verification unit 40 reads the received identifier from the identifier holding unit 35 and reads a system-specific identifier from an identifier storage unit 39. The identifier verification unit 40 then compares the received identifier with the system-specific identifier to determine whether they match, and furnishes the determination result to the comprehensively determination unit 41A.

The comprehensively determination unit 41A reads the data-selection indicating data from the data-selection indicating data storage unit 43. Based on the data-selection indicating data, the comprehensively determination unit 41A determines whether or not to enable the plurality of control units 22 to 24, according to the verification result from the feature verification unit 38, the verification result from the identifier verification unit 40, or both of them. The comprehensively determination unit 41A then furnishes the determination result to a communications unit 42. The communications unit 42 furnishes control signals to the engine start/stop control unit 22, the door lock/unlock unit 23, and the trunk opening control unit 24, respectively, according to the determination result from the comprehensively determination unit 41A.

Next, a description will be made as to the selection of information to be verified. The selection of information to be verified can be performed according to a manipulation of either one of the operation units 18 and 44, which is performed by the user. From the viewpoint of the security of the system, it is desirable that authentication is carried out to confirm the identity of the user before such a manipulation is done.

When the user performs a manipulation on the operation unit 18, the operation unit 18 selects information to be verified from the fingerprint information and the identifier according to the manipulation, and stores data-selection indicating data indicating the selection of information to be verified in the data-selection indicating data storage unit 16. The radio communications unit 14A transmits the data-selection indicating data by way of the antenna 15. The display unit 17 displays which information to be verified is selected from the fingerprint information and the identifier according to the data-selection indicating data stored in the data-selection indicating data storage unit 16. The display unit 17 can be constructed of an array of light emitting diodes. As an alternative, the display unit 17 can be a liquid crystal display.

The radio communications unit 32A of the receiver 21 receives the data-selection indicating data by way of the antenna 31, and stores it in the data-selection indicating data storage unit 43.

On the other hand, when the user performs a manipulation on the operation unit 44, the operation unit 44 selects information to be verified from the fingerprint information and the identifier according to the manipulation, and stores data-selection indicating data indicating the selection of information to be verified in the data-selection indicating data storage unit 43. The radio communications unit 32A transmits the data-selection indicating data by way of the antenna 31.

The radio communications unit 14A of the mobile transmitter 1 receives the data-selection indicating data by way of the antenna 15, and stores it in the data-selection indicating data storage unit 16. The display unit 17 displays which information to be verified is selected from the fingerprint information and the identifier according to the data-selection indicating data stored in the data-selection indicating data storage unit 16.

In this manner, both the mobile transmitter 1 and the receiver 21 can share the same data-selection indicating data. According to the data-selection indicating data, only the fingerprint information, only the identifier, or both of them are selected as information to be verified which will be used for the verification of the identity of the user.

Figure 3:
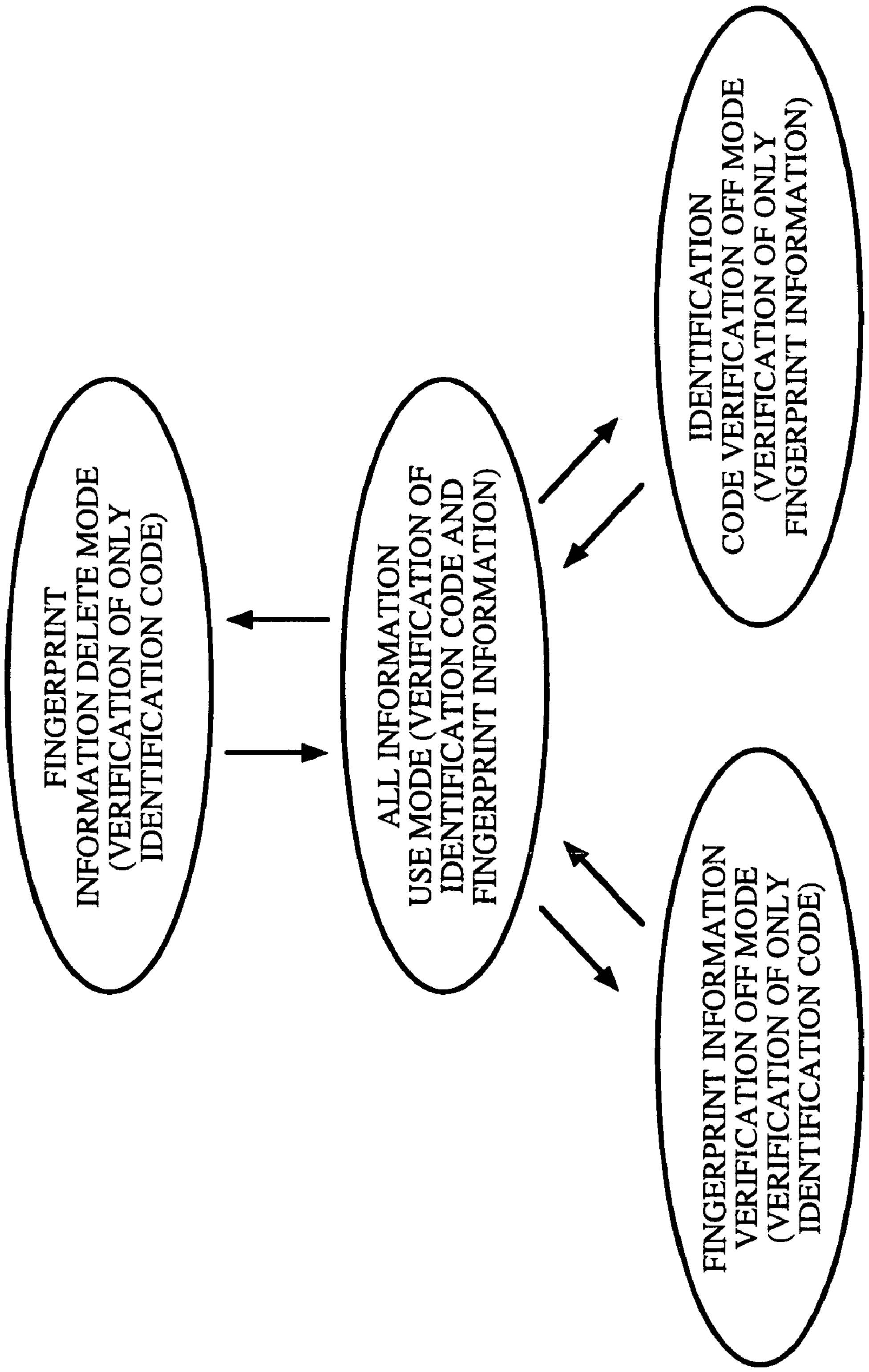
FIG. 3 is a state transition diagram showing a transition between processing modes.

Using either one of the operation units 18 and 44, the user can select between all information use, fingerprint information verification off, fingerprint information delete, and identifier verification off modes in the receiver 21. Referring next to FIG. 3, there is illustrated a state transition diagram showing transitions between these processing modes. The fingerprint information delete mode is a processing mode in which all pieces of fingerprint information (i.e. all sets of features stored in the feature storage unit 37) are deleted and the verification unit is enabled to verify the identity of the received identifier, whereas the verification unit is disabled to verify the identity of the received fingerprint information. In the fingerprint information delete mode, any user with an authorized mobile transmitter can operate the vehicle without the verification of the user's fingerprint. For example, by switching to the fingerprint information delete mode prior to shipment of a vehicle provided with a receiver according to the second embodiment, any dealer can give any person permission to operate the vehicle without the verification of the user's fingerprint until it is sold. When the owner of a vehicle provided with a receiver according to the second embodiment sells the vehicle, the user can delete the fingerprint information about the user's fingerprint and give any person permission to operate the vehicle without the verification of the user's fingerprint, by switching to the fingerprint information delete mode.

The all information use mode is a processing mode in which the verification unit is enabled to verify the received fingerprint information and the received identifier against a list of pieces of previously stored fingerprint information and a previously stored identifier, respectively. In this mode, if no fingerprint information is stored in the feature storage unit 37, features, which are extracted from the received fingerprint information stored in the fingerprint information holding unit 34 by the feature extracting unit 36, can be stored in the feature storage unit 37.

The fingerprint information verification off mode is a processing mode in which the verification unit is enabled to verify the identity of the received identifier, whereas the verification unit is disabled to verify the identity of the received fingerprint information. The identifier verification off mode is a processing mode in which the verification unit is enabled to verify the identity of the received fingerprint information, whereas the verification unit is disabled to verify the identity of the received identifier.

In the exemplary embodiment shown, the user can select kinds of information to be verified by manipulating either the operation unit 18 of the mobile transmitter 1 or the operation unit 44 of the receiver 21. In a variant, only one of the mobile transmitter 1 and the receiver 21 includes such the operation unit.

As previously mentioned, in accordance with the second embodiment of the present invention, the vehicle key system can select information to be verified from the fingerprint information and the identifier, and switch to the fingerprint information verification off mode in which the verification unit is enabled to verify the identity of the received identifier, whereas the verification unit is disabled to verify the identity of the received fingerprint information, when the user makes a request of an outsider who is not an authorized user, such as a clerk at a dealer or a door man at a hotel, to manage the vehicle temporarily, for example, and switch to the identifier verification off mode in which the verification unit is enabled to verify the identity of the received fingerprint information, whereas the verification unit is disabled to verify the identity of the received identifier, when a plurality of vehicles are managed in a commuter system, thereby providing security according to the circumstances and improving the convenience of the system.

In addition, since the mobile transmitter includes the display unit 17 for displaying kinds of information to be verified, the second embodiment offers an advantage of making it possible for the user to easily recognize the kinds of information to be verified.

Either a control switch included in the vehicle, such as a wiper switch, or a pedal, such as an acceleration pedal, can also serve as the operation unit 44. As an alternative, an operation unit intended for a navigation device, which provides a variety of navigation services, such as guidance on a route from a current position to a destination, for users, can also serve as the operation unit 44. In either case, no additional operation unit is needed and therefore the cost of the vehicle key system can be reduced.

The vehicle key system according to the above-mentioned first embodiment can include an operation unit having the same structure and function as the operation unit 18 or 44. In this case, the vehicle key system can allow the user to select between the processing modes in the receiver 21, like that of the second embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle key system for verifying identity of fingerprint information about a user's fingerprint and for controlling pieces of equipment in a vehicle according to a verification result, said system comprising:

a transmitter including a fingerprint information capturing means for capturing fingerprint information from a user's fingerprint, an identifier storage means for storing an identifier specific to said transmitter, and a transmitting means for transmitting both the fingerprint information and the system-specific identifier; and a receiver disposed in the vehicle, including a receiving means for receiving the fingerprint information and the identifier transmitted from said transmitting means of said transmitter, a verification means for verifying the received fingerprint information against a list of pieces of previously stored fingerprint information, and for verifying the received identifier against a previously stored identifier, said verification means including feature verification means for verifying the features extracted from the fingerprint information received from said transmitter against features of an authorized user stored by said receiver; an identifier verification means for verifying the specific identifier received from said transmitter and the specific identifier stored by said receiver, and comprehensively determining means for determining whether or not a user manipulating said transmitter is an authorized user and whether or not the manipulation is directed toward the vehicle corresponding to said transmitter; and a control means for controlling said pieces of equipment in the vehicle according to verification results from said verification means.

2. The vehicle key system according to claim 1, wherein said control means comprising engine control means for controlling an engine according to the verification result from said receiver, door control means for controlling a lock of doors according to the verification results from said receiver, and a trunk control means for controlling a lock of a trunk according to the verification result of the receiver.

3. The vehicle key system according to claim 1, wherein said receiver further comprising:

a first operation means for selecting the fingerprint information and the identifier according to a manipulation performed by a user, a first verification data-selection state storage means for storing the verification data-selection state indicating a selection state of the verification data whose value is set by said first operation means and a selection state of the verification data received by said transmitter, and a display means for displaying which information to be verified is selected from the fingerprint information and the identifier selected.

4. The vehicle key system according to claim 3, wherein said transmitter further comprising:

a second operation means for selecting the fingerprint information and the identifier according to a manipulation performed by a user, and a second verification data-selection state storage means for storing the verification data-selection state indicating a selection state of the verification data whose value is set by said first operation means and a selection state of the verification data received by said transmitter.

5. The vehicle key system according to claim 3, wherein an operation unit intended for operating a piece of equipment disposed in said vehicle also serves as said first operation means.

6. The vehicle key system according to claim 5, wherein said equipment is a navigation device.

7. The vehicle key system according to claim 3, wherein a pedal disposed in said vehicle also serves as said first operation means.

* * * * *